United States Patent

[11] 3,537,480

| | | |
|---|---|---|
| [72] | Inventor | Malcolm C. Tate<br>Stamford, Connecticut |
| [21] | Appl. No. | 745,847 |
| [22] | Filed | July 18, 1968 |
| [45] | Patented | Nov. 3, 1970 |
| [73] | Assignee | The A. H. Emery Company<br>New Canaan, Connecticut |

[54] HYDRAULIC SYSTEM TEMPERATURE COMPENSATOR
3 Claims, 3 Drawing Figs.

[52] U.S. Cl. ..................... 138/26, 138/31
[51] Int. Cl. ..................... F16l 55/12
[50] Field of Search ............. 138/26, 31; 73/393; 60/(Considered); 177/(Considered); 103/(Considered); 181/(Considered)

[56] References Cited
UNITED STATES PATENTS

| | | | |
|---|---|---|---|
| 2,252,946 | 8/1941 | Persons | 92/1 |
| 2,513,476 | 7/1950 | Griffith | 92/1X |
| 2,536,628 | 1/1951 | Denisoff | 92/1X |
| 2,755,819 | 9/1956 | Titus | 138/26 |

*Primary Examiner*—Herbert F. Ross
*Attorney*—Blair Cesari and St. Onge

ABSTRACT: The application discloses an adjustable temperature compensator for connection to a hydraulic fluid line of a hydraulic weighing or other control system for the purpose of accomodating and neutralizing variations in fluid pressure within the system caused by expansion or contraction of the fluid due to temperature changes. A metallic cylinder formed of a metal having negligible temperature coefficient of expansion, such as the nickel alloy known as Invar, is enclosed within a cylindrical cavity formed in a material having a positive coefficient of expansion, such as aluminum, along with a selected number of thin cylindrical discs of low thermal coefficient metal, such as stainless steel; a removable cover plate is mounted over the otherwise open end of the cylindrical cavity and clamped by means forming a pressure tight seal. A fluid port through the cover plate is connected to a hydraulic line of the system to be compensated for temperature changes, and a sealable vent port is provided in the opposite end of the cavity member for bleeding air and excess fluid from the system.

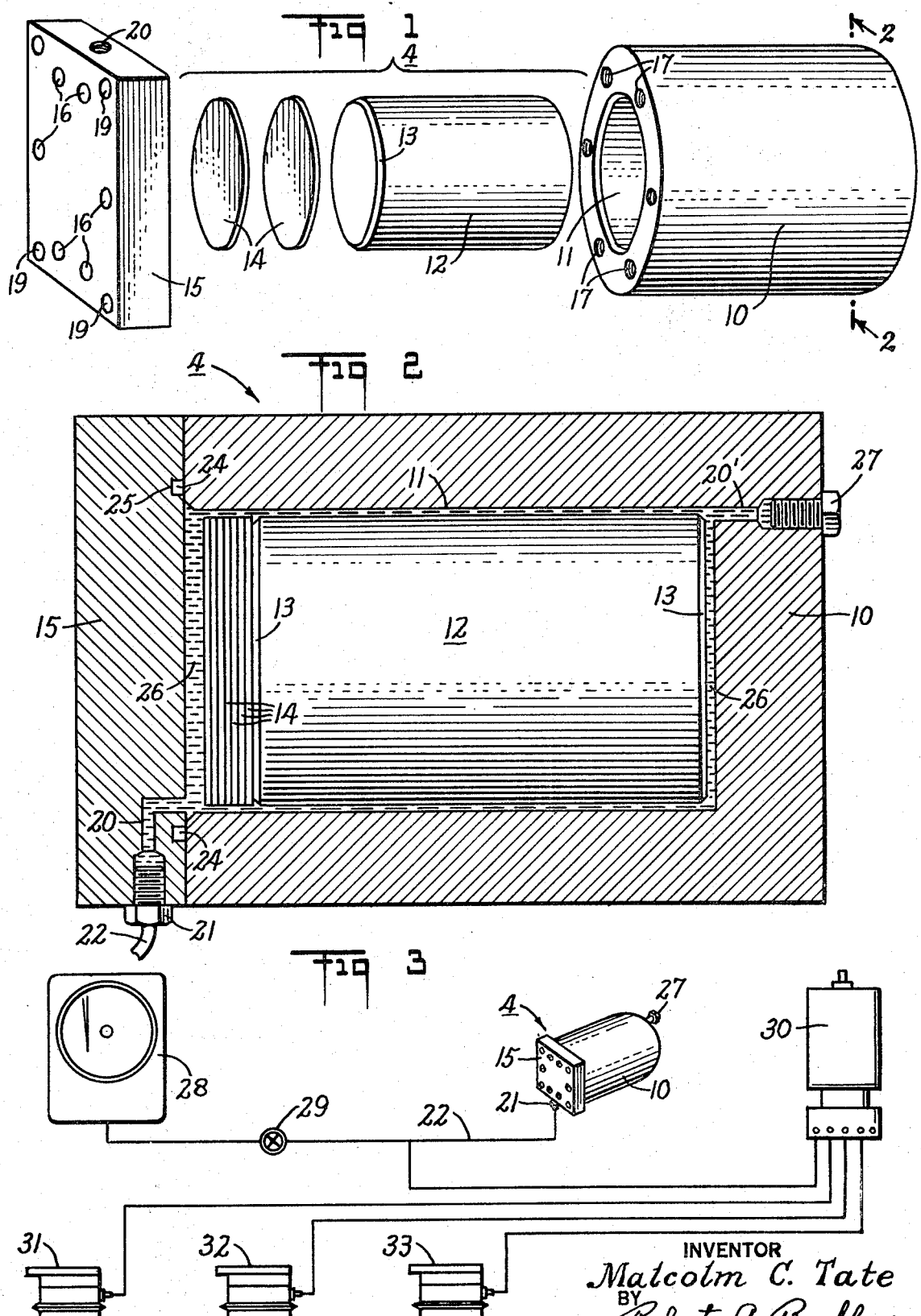

3,537,480

HYDRAULIC SYSTEM TEMPERATURE COMPENSATOR

This abstract is not to be interpreted as in any way limiting the applicant's claims.

BACKGROUND OF THE INVENTION

In all hydraulic weighing or control systems the fluid employed, usually a specially constituted oil product, is selected to have a minimum of volumetric expansion or contraction over the ambient temperature range in which the system is to be operated. However, in the present state of the art even the best of fluids available for this purpose do undergo some volumetric change as a result of temperature changes, particularly where a relatively large volume of fluid is enclosed within the system and where substantial changes in temperature occur as between day and night, or seasonal weather changes, or other environmental factors such as proximity to blast furnaces or other heat generating apparatus whose cycle of operation may not be continuous. While it may be possible through careful and costly engineering to design an individual hydraulic system with reasonable temperature compensation to suit its specific environment, the object of the present invention is to provide a universal temperature compensator which may be readily and easily adjusted on location to provide the desired degree of temperature compensation for any hydraulic control or weighing system. Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

FIG. 1 is an exploded perspective view of the principal component parts of the device of the invention, showing the several parts in their relative positions for assembly;

FIG. 2 is a cross-sectional view through the center of the assembled device, taken along the line 2–2 of FIG. 1; and FIG. 3 is a schematic diagram of a typical hydraulic weighing and control system showing the manner in which the temperature compensator of the invention is connected thereto.

In the several views of the drawing, like reference numerals refer to corresponding elements of the device.

DETAILED DESCRIPTION

Referring now in greater detail to the drawing, the exploded view of FIG. 1 illustrates a cylindrical casing member 10, preferably formed of aluminum or other metal having a significant positive temperature coefficient of expansion. A cylindrical cavity opening 11 is formed co-axially in one end of casing 10 but does not extend through the opposite end thereof (as will be apparent from FIG. 2). A solid cylindrical member 12, having an outer diameter slightly less than the inner diameter of cavity 11, is preferably formed of the nickel alloy known as Invar, or other suitable material having a negligible temperature coefficient of expansion. The opposite ends of cylinder 12 are preferably chamfered, as at 13, to facilitate insertion thereof into cavity 11 during assembly. A plurality of thin metallic discs 14, of substantially the same diameter as cylinder 12, are formed of a material having a relatively low thermal coefficient of expansion, such as for example stainless steel sheet stock.

A cover member 15, preferably formed of the same metal as the casing member 10, is pierced with a plurality of circularly arrayed holes 16 through which clamping screws (not shown) are passed to threadably engage a corresponding array of tapped holes 17 in the face 18 of cylinder 10. The cover plate 15 in the preferred embodiment illustrated by the drawing is made square, with each linear side being equal in dimension to the outer diameter of the cylindrical casing member 10, whereby mounting holes 19 are passed through each of the four corners of the plate 15 to facilitate mounting of the completely assembled compensator device to any convenient support near the hydraulic system installation where the normal temperature variations of the system occur. It is to be understood that the use of cylindrical casing 10, cavity 11 and insert members 12 and 14 is considered preferable because of the ease and economy of machining such configurations, but that these members may be formed of rectangular or polygonal configuration within the scope of the invention, or the cover plate 15 may be made cylindrical to conform with the diameter of casing 10, or of a larger diameter if it is desired to provide circularly disposed mounting holes. A fluid entry port 20 in one edge of cover 15 connects with the interior of cavity 11 and is provided with a pressure fitting 21 for connection to a hydraulic system line 22, as shown in FIG. 2.

Referring now to FIG. 2 it will be seen that when the component parts are assembled and the cover 15 is clamped to the casing 10 a resilient O-ring 24 mounted in an annular recess 25 of cover 15 provides a tight hermetic seal for containing the hydraulic fluid 26 under pressure. Of course, a sealing gasket may be employed in lieu of the O-ring 24 if preferred. An exhaust port 26 in the bottom of casing 10 connects at its inner end with cavity 11 and is closed by a removable sealing plug 27, to provide means for removing air and excess fluid from the compensator device, and from the hydraulic system to which it is connected. In FIG. 2 a plurality of seven discs 14 are shown impressed against each other and against the end of cylinder 12 by the force of fluid 26 which is under pressure. The choice of the number of discs 14 to be inserted into the device is determined by the total amount of hydraulic fluid in the system to be compensated, the range of temperature change over which the system is to be compensated, and the degree of temperature compensation required to produce the desired accuracy of pressure indication or control throughout the entire hydraulic system. This selection of the proper number of discs to be employed may be done empirically, but the procedure may be considerably expedited by the use of the formulae and accompanying tables which will be described hereinafter.

Referring now to FIG. 3 of the drawing it will be seen that the temperature compensator of the invention, indicated generally at 4, is here connected to a hydraulic line 22 which also connects with a typical pressure indicator-recorder 28 and with a controller 29, which may serve to interrupt the feed of materials in an automatic batch-weighing system or the like, and with the output hydraulic line of a load totalizer 30. The input to load totalizer 30 is here shown to be from a plurality of hydraulic load cells 31, 32 and 33 which preferably are of the type disclosed in U.S. Pat. No. 3,178,937 which issued Apr. 20, 1965 to C. D. Bradley, and is assigned to the assignee of the present application. Such load cells have built in temperature compensation and hence the hydraulic lines by which they are connected to the totalizer 30 do not require connection with a compensator as provided by the present invention. As shown in FIG. 3 the compensator 4 is mounted horizontally with its input port 21 oriented at the bottom of plate 15, and its vent plug 27 at the top of casing 10. It is to be understood, however, that the compensator of the invention works equally well if mounted vertically, with the plate 15 serving either as the bottom or the top, but if the cover 15 is uppermost then the line 22 must be connected to the then bottom opening 27, and the port 21 then receives the vent plug. In other words the top port should always be the location of the vent plug, and the bottom port is connected to the hydraulic line of the system to be compensated, however the compensator is mounted. The line 22 by which the compensator is connected to the hydraulic system should be kept as short as possible, and the compensator should be connected into the system at a location where ambient temperature changes are typical of those for the system as a whole. When a typical hydraulic pressure system such as represented by FIG. 3 experiences a rise in temperature, the fluid within the system expands more than the tubing and other metal parts which contain the fluid, thereby producing some increase in fluid pressure, then one disc may be removed from the compensator. It will Referring once again to FIG. 2 of the drawing, the manner in which the temperature compensator of the invention counteracts the increase in fluid pressure resulting from fluid expansion with rising temperature is as follows. A rise of temperature expands the volume of the aluminum casing shell 10, thereby increasing the volume of the internal cavity 11. However, the solid volume of the Invar cylinder 12 remains virtually unchanged due to the extremely low thermal coefficient of expansion of this nickel alloy metal. The net increase of volume within the chamber 11 is greater than the expansion of the small quantity of fluid within the chamber, thereby creating a vacuum into which the expanding fluid from the external hydraulic system is drawn through line 22. In this manner the expansion of fluid in the hydraulic system as temperature rises is accommodated within the chamber of the temperature compensator, to maintain a constant fluid pressure throughout the entire system. The reverse occurs as temperature falls; as the system fluid contracts in volume, the aluminum chamber 10 also contracts to force more fluid from the chamber back into the hydraulic system lines and thereby maintain the fluid pressure constant throughout the system. The greater the number of discs 14 installed within chamber 11, the less hydraulic fluid will be retained therein and consequently the greater will be the compensating effect of the device for the hydraulic system to which it is connected. By determining the total fluid volume within the complete hydraulic system, and then measuring and recording pressure changes per degree of temperature change over the full range of ambient operating temperatures of an installed system, with all other factors such as load or other variable parameter maintained constant, a volumetric scale can be obtained showing the rate of volumetric compensation necessary to maintain constant pressure.

For example, as a result of numerous field tests of a variety of hydraulic systems operating under widely varying ambient temperature conditions, and employing a temperature compensator made according to the invention with the following dimensions:

|  | Inches |
|---|---|
| O.D. aluminum casing | 4½ |
| I.D. casing bore | 3.507 |
| O.D. invar cylinder | 3.500 |
| Depth of chamber bore | 6 |
| Length of invar cylinder | 5.375 |
| Thickness of discs (22 ga. S.S.) | 0.030 |

I have found that the insertion of four discs into the compensator produces approximately 0.0005 (in.$^3$/°F.) of compensation volume. Thus, having determined the volumetric compensation per degree of temperature change required for any hydraulic system installation as described above, it is a simple matter to determine the number of discs to be inserted into the compensator. After this is done, I recommend that another temperature test of the system be run with the compensator connected as described. If this test discloses a need for more than 0.00025 in.$^3$/°F. additional compensation, then one more disc may be added to the compensator. If this final test run should disclose over compensation in excess of 0.00025 in.$^3$/°F may be removed from the compensator. It will be readily appreciated by those skilled in the art that any desired degree of accuracy in temperature compensation may be achieved through the present invention by the simple expedient of employing a greater number of thinner discs than those described in the example given above, or the given dimensional parameters of the compensator structure may be varied for the same purpose.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

I claim:

1. An adjustable temperature compensator for a hydraulic weighing system comprising in combination:
   A. a cylindrical container formed of a metal having a positive temperature coefficient of expansion,
      1. said container having a cavity bore therein;
   B. a solid cylindrical member having a low temperature coefficient of expansion relative to that of said container,
      1. said cylindrical member having a diameter slightly less than the diameter of said cavity bore;
   C. a plurality of separate discs of substantially the same diameter as said cylindrical member and formed of a metal having a low temperature coefficient of expansion relative to that of said container,
      1. whereby said discs and cylindrical member fit within said cavity bore and substantially fill the space within said container,
   D. removable cover means for sealing said cylindrical member and said discs within said cavity bore; and
   E. connecting means for introducing hydraulic fluid from a hydraulic system line into said cavity bore within said sealed container to surround said cylindrical member and said discs and fill the remaining space within said selaed container,
      1. the fluid having a large temperature coefficient of expansion relative to that of said container, said cylindrical member and said discs.

2. The compensator defined in claim 1, which further includes a vent port in said container for venting accummulated gas therefrom as hydraulic fluid enters said cavity bore through said connecting means.

3. The combination of claim 2 wherein said removable cover means is formed in a rectangular configuration and is provided with mounting holes through the corners thereof which extend beyond the diameter of said cylindrical container.